(12) United States Patent
Hollis

(10) Patent No.: US 10,146,614 B2
(45) Date of Patent: *Dec. 4, 2018

(54) ENCODING DATA IN A MODIFIED-MEMORY SYSTEM

(71) Applicant: Micron Technology, Inc., Boise, ID (US)

(72) Inventor: Timothy M. Hollis, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 11 days.

This patent is subject to a terminal disclaimer.

(21) Appl. No.: 14/833,876

(22) Filed: Aug. 24, 2015

(65) Prior Publication Data

US 2015/0363260 A1 Dec. 17, 2015

Related U.S. Application Data

(63) Continuation of application No. 12/136,868, filed on Jun. 11, 2008, now Pat. No. 9,116,828.

(51) Int. Cl.
*G11C 29/00* (2006.01)
*G11C 7/00* (2006.01)
(Continued)

(52) U.S. Cl.
CPC ...... *G06F 11/1004* (2013.01); *G06F 11/1008* (2013.01); *G06F 11/1048* (2013.01)

(58) Field of Classification Search
None
See application file for complete search history.

(56) References Cited

U.S. PATENT DOCUMENTS 5,850,483 A 12/1998 Takabatake et al.
6,182,177 B1 * 1/2001 Harriman ................ G06F 13/18
710/112

(Continued)

OTHER PUBLICATIONS

Paul Horowitz and Winfield Hill (1989). The Art of Electronics (2nd ed.). Cambridge University Press. p. 685,766. ISBN 978-0-521-37095-0.*

(Continued)

*Primary Examiner* — Justin R Knapp
(74) *Attorney, Agent, or Firm* — Schwegman Lundberg & Woessner, P.A.

(57) ABSTRACT

In one embodiment, a set of memory circuits is separated from a logic system by a bus. The logic system can contain many of the logic functions traditionally performed on conventional memory circuits, and accordingly the memory circuits can be modified to not include such logic functions. The logic system, which can be a logic integrated circuit intervening between the modified-memory circuits and a traditional memory controller, additionally contains encoding and decoding circuitry. In such a system, data are encoded and at least one indicator bit is issued when writing to the modified-memory circuits. The modified-memory circuits in turn store the at least one indicator bit with the encoded data. When the encoded data are read from the modified-memory circuits, the data are transmitted across the bus in their encoded state along with the at least one indicator bit. The logic integrated circuit then decodes the data using the at least one indicator bit to return the data to their original states. Other systems and methods are disclosed.

5 Claims, 12 Drawing Sheets (51) Int. Cl.
*H03M 13/00* (2006.01)
*G06F 11/10* (2006.01)

(56) References Cited

U.S. PATENT DOCUMENTS

| | | | |
|---|---|---|---|
| 6,505,308 B1 * | 1/2003 | Schwarz | G11C 29/78 711/104 |
| 6,584,572 B1 | 6/2003 | Choi | |
| 6,721,918 B2 | 4/2004 | Self et al. | |
| 7,280,412 B2 | 10/2007 | Jang et al. | |
| 7,352,299 B1 | 4/2008 | Liu | |
| 7,406,608 B2 | 7/2008 | Joshi | |
| 7,586,943 B2 | 9/2009 | Pappelardo et al. | |
| 7,916,945 B2 | 3/2011 | Matsuzaki et al. | |
| 8,199,035 B2 | 6/2012 | Bae et al. | |
| 9,116,828 B2 | 8/2015 | Hollis | |
| 2002/0156953 A1 | 10/2002 | Bailey et al. | |
| 2003/0046483 A1 | 3/2003 | Moschopoulos | |
| 2004/0042292 A1 | 3/2004 | Sakata et al. | |
| 2004/0065904 A1 | 4/2004 | Yoshida et al. | |
| 2005/0128835 A1 | 6/2005 | Sakata et al. | |
| 2007/0038789 A1 | 2/2007 | Macri et al. | |
| 2007/0174643 A1 | 7/2007 | Graef | |
| 2008/0016289 A1 | 1/2008 | Pennock et al. | |
| 2008/0056017 A1 | 3/2008 | Suzuki et al. | |
| 2008/0140987 A1 | 6/2008 | Rixner et al. | |
| 2009/0110109 A1 | 4/2009 | Skerlj | |
| 2009/0313521 A1 | 12/2009 | Hollis | |
| 2011/0200118 A1 | 8/2011 | Veltman et al. | |

OTHER PUBLICATIONS

Stan, M, "Bus-invert coding for low-power I/O", IEEE Transactions on Very Large Scale Integration (VLSI) Systems, 3(1), (Mar. 1995), 49-58.

Stan, M R, et al., "Coding a Terminated Bus for Low Power", Great Lakes Symp. on VLSI, (Mar. 1995), 70-73.

U.S. Appl. No. 11/873,779, filed Oct. 17, 2007.
U.S. Appl. No. 12/015,311, filed Jan. 16, 2008.
U.S. Appl. No. 12/136,868, Non Final Office Action dated Sep. 16, 2011, 8 pgs.
U.S. Appl. No. 12/136,868, Response filed Dec. 5, 2011 to Non Final Office Action dated Sep. 16, 2011, 12 pgs.
U.S. Appl. No. 12/136,868, Non Final Office Action dated Mar. 14, 2012, 14 pgs.
U.S. Appl. No. 12/136,868, Response filed Aug. 14, 2012 to Non Final Office Action dated Mar. 14, 2012, 13 pgs.
U.S. Appl. No. 12/136,868, Final Office Action dated Mar. 1, 2013, 16 pgs.
U.S. Appl. No. 12/136,868, Response filed Jul. 1, 2013 to Final Office Action dated Mar. 1, 2013, 18 pgs.
U.S. Appl. No. 12/136,868, Non Final Office Action dated Aug. 30, 2013, 17 pgs.
U.S. Appl. No. 12/136,868, Response filed Jan. 29, 2014 to Non Final Office Action dated Aug. 30, 2013, 18 pgs.
U.S. Appl. No. 12/136,868, Final Office Action dated May 22, 2014, 18 pgs.
U.S. Appl. No. 12/136,868, Response filed Jul. 22, 2014 to Final Office Action dated May 22, 2014, 22 pgs.
U.S. Appl. No. 12/136,868, Advisory Action dated Aug. 6, 2014, 3 pgs.
U.S. Appl. No. 12/136,868, Non Final Office Action dated Sep. 25, 2014, 14 pgs.
U.S. Appl. No. 12/136,868, Examiner Interview Summary dated Sep. 29, 2014, 3 pgs.
U.S. Appl. No. 12/136,868, Response filed Dec. 18, 2014 to Non Final Office Action dated Sep. 25, 2014, 17 pgs.
U.S. Appl. No. 12/136,868, Final Office Action dated Jan. 14, 2015, 6 pgs.
U.S. Appl. No. 12/136,868, Response filed Mar. 13, 2015 to Final Office Action dated Jan. 14, 2015, 10 pgs.
U.S. Appl. No. 12/136,868, Notice of Allowance dated Apr. 17, 2015, 5 pgs.
U.S. Appl. No. 12/136,868, Supplemental Notice of Allowability dated May 8, 2015, 3 pgs.

* cited by examiner

| Data without DBI | | | Data with DBI | | |
|---|---|---|---|---|---|
| 1 2 3 4 5 6 7 8 | Transitions | | 1 2 3 4 5 6 7 8 | DBI | Transitions |
| 0 0 0 0 0 0 0 0 | N/A | | 0 0 0 0 0 0 0 0 | 1 | N/A |
| 1 1 1 1 1 1 1 1 | 8 | → | 0 0 0 0 0 0 0 0 | 0 | 1 |
| 0 0 0 0 0 0 0 0 | 8 | | 0 0 0 0 0 0 0 0 | 1 | 1 |
| 1 1 1 1 1 1 1 1 | 8 | → | 0 0 0 0 0 0 0 0 | 0 | 1 |
| 1 0 1 1 0 1 1 0 | 3 | → | 0 1 0 0 1 0 0 1 | 0 | 3 |
| 0 0 1 1 0 0 1 1 | 3 | → | 1 1 0 0 1 1 0 0 | 0 | 3 |
| 0 1 0 1 0 0 1 0 | 3 | → | 1 0 1 0 1 1 0 1 | 0 | 3 |
| 1 1 0 0 0 1 0 1 | 6 | | 1 1 0 0 0 1 0 1 | 1 | 4 |
| 0 0 1 0 1 0 1 0 | 7 | → | 1 1 0 1 0 1 0 1 | 0 | 2 |

ENCODING DATA IN A MODIFIED-MEMORY SYSTEM

CROSS-REFERENCE TO RELATED APPLICATIONS

This application is a continuation patent application of U.S. application Ser. No. 12/136,868, filed Jun. 11, 2008, now issued as U.S. Pat. No. 9,116,828, and entitled "Data Bus Inversion Usable in a Memory System," which is hereby incorporated by reference in its entirety.

FIELD OF THE INVENTION

Embodiments of this invention relate to implementation of data bus inversion in a memory system.

BACKGROUND

Figure 1:
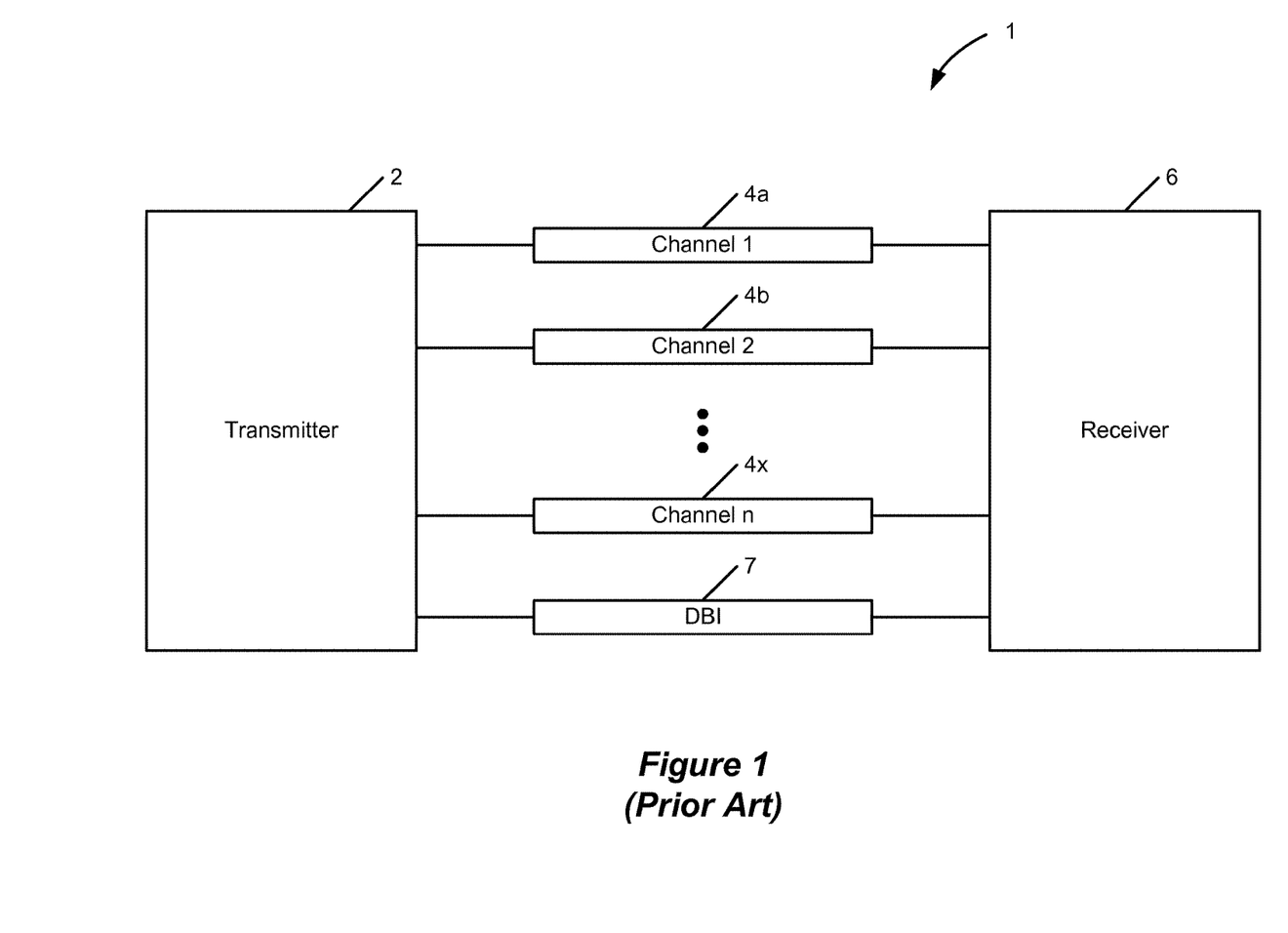
FIG. 1 illustrates a block diagram of a data transmission system.

An example illustrating data transmission between high-speed components within a single semiconductor device, or between two devices on a printed circuit board, is represented by the system 1 shown in FIG. 1. In FIG. 1, a transmitter 2 (e.g., a microprocessor) sends data over one or more transmission channels 4x (e.g., conductive traces "on-chip" in a semiconductor device or on a printed circuit board) to a receiver 6 (e.g., another microprocessor or memory). As a group, such transmission channels 4x are often referred to as a "data bus," which allows one or more data signals to be transmitted from one device to another.

As discussed in U.S. patent application Ser. No. 11/873,779, filed Oct. 17, 2007, a data bus is susceptible to cross talk, simultaneous switching noise, intersymbol interference, and draws power based on the state of the data and/or frequency of data transition. One way to reduce these adverse effects and to prevent unnecessary power consumption is to encode the data. One specific form of data encoding that can be used is Data Bus Inversion (DBI).

Implementation of DBI includes encoding circuitry at the transmitter that assesses the relationship between data bits to be transmitted across a data bus and then decides (based on a particular DBI algorithm) if it would be advantageous to invert some or all of the data bits prior to transmission. If the data bits are inverted, an additional signal, referred to as a DBI bit, is also set at the encoding circuitry to indicate that the data bits are inverted. Typically, as shown in FIG. 1, an extra channel 7 is then needed so that the DBI bit may be transmitted in parallel with the data bits to inform the receiving circuitry which groups of data bits have been inverted. The receiver 6 then uses the DBI bit in conjunction with decoding circuitry to return the incoming group of data bits to their original state.

Figure 2A:
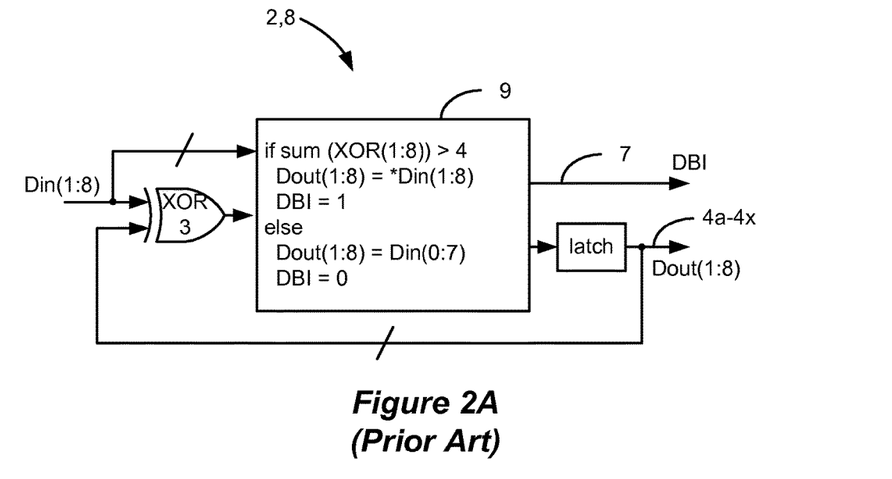
FIGS. 2A and 2B illustrates a block diagram and a data table illustrating a minimum transitions DBI technique.
Figure 2B:
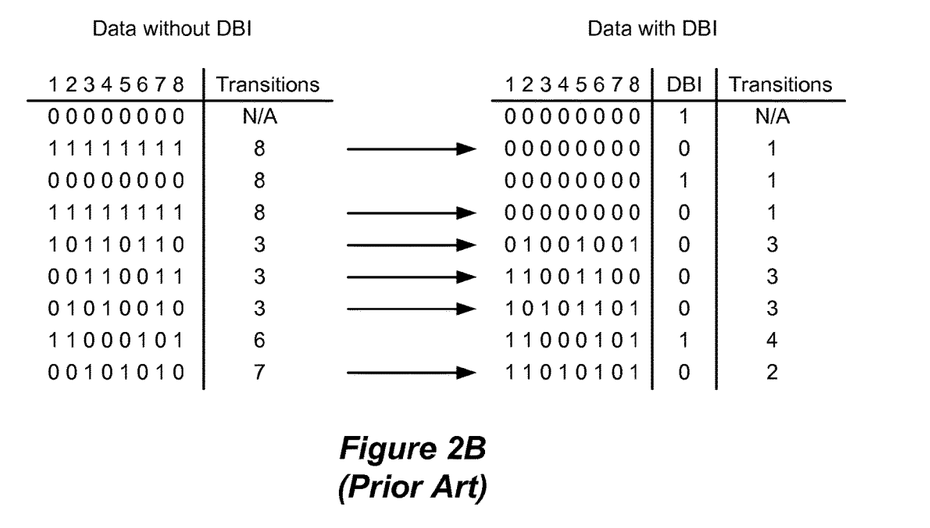

One specific DBI algorithm, illustrated in FIGS. 2A and 2B, is referred to as the "minimum transitions" algorithm. While there may be variations of this technique, in general the minimum transitions algorithm begins by computing how many bits will transition during an upcoming cycle. When more than a certain number of transitions are determined, encoding circuitry inverts the entire bus, sets the DBI bit to a specified state (high or low depending on the implementation), and drives the inverted data bits and the DBI bit in parallel across the transmission channels 4x and 7, where the DBI bit is used to decode (i.e., de-invert) the inverted data bits prior to use in the receiver 6.

The minimum transitions technique can be implemented in one embodiment using the encoding circuitry 8 of FIG. 2A. Because this technique is discussed at length in the above-mentioned '779 application, it is explained only briefly here. As shown, two successive bytes of data, Din(0:7) (the current byte) and Dout(0:7) (the previous byte), are compared at exclusive OR (XOR) gates 3 on a bit-by-bit basis to determine which bits in the data signals are changing. After this XOR comparison, and in accordance with DBI algorithm 9, the XOR results are summed, and a determination is made as to whether the sum is greater than four (i.e., whether there are at least five transitions from the previous byte of data to the current byte). If the sum is greater than four, the current byte is inverted before it is transmitted, and the DBI bit 7 is transmitted as '1.' Alternatively, if the sum is four or less (i.e., there are no more than four transitions from one byte to the next), the data is transmitted unaltered, and the DBI bit 7 is transmitted as '0.'

FIG. 2B shows how the minimum transitions DBI algorithm 9 works to reduce the number of transitions in a random sequence of bytes, such that no more than four transitions are permitted between successive bytes. Again, this reduction of transitions reduces dynamic current draw at the transmitter 2 and improves the reliability of data transfer by reducing cross talk and simultaneous switching noise.

Other DBI algorithms exists, such as are discussed in the above-mentioned '779 application, and thus one skilled in the art will realize that the DBI technique illustrated in FIGS. 2A and 2B is merely exemplary. For example, some DBI techniques may use more than one DBI bit to provide even finer control over which bits of data will be inverted, as mentioned in the '779 application.

The inventor believes that advances in system integration are making the implementation of DBI, and other data encoding algorithms, more attractive. At the same time, the use of such algorithms is becoming more important as systems shrink and as it becomes increasingly important that such systems reduce their power consumption and operate at high speeds.

DETAILED DESCRIPTION

Implementations of Data Bus Inversion (DBI) techniques within a memory system are disclosed. In one embodiment, a set of random access memory (RAM) integrated circuits (ICs) is separated from a logic system by a bus. The logic system can contain many of the logic functions traditionally performed on conventional RAM ICs, and accordingly the RAM ICs can be modified to not include such logic functions. The logic system, which can be a logic integrated circuit intervening between the modified RAM ICs and a traditional memory controller, additionally contains DBI encoding and decoding circuitry. In such a system, data is DBI encoded and at least one DBI bit issued when writing to the modified RAM ICs. The RAM ICs in turn store the DBI bit(s) with the encoded data. When the encoded data is read from the modified RAM ICs, it is transmitted across the bus in its encoded state along with the DBI bit(s). The logic integrated circuit then decodes the data using the DBI bit(s) to return it to its original state.

In another embodiment, DBI may be implemented only for data being transmitted in one direction over the bus, for example, when writing to the memory. In this implementation, the logic integrated circuit includes a DBI encoder, with the DBI decoder occurring on the modified RAM ICs. Data written to the modified RAM ICs is encoded and issued with at least one DBI bit on the bus. At the modified RAM ICs, the data is then decoded using the DBI bit(s) and stored in its original un-encoded state. When data is read from the modified RAM ICs, no DBI encoding occurs, and there is no need to have stored the DBI bit(s) in the modified RAM ICs.

Figure 3A:
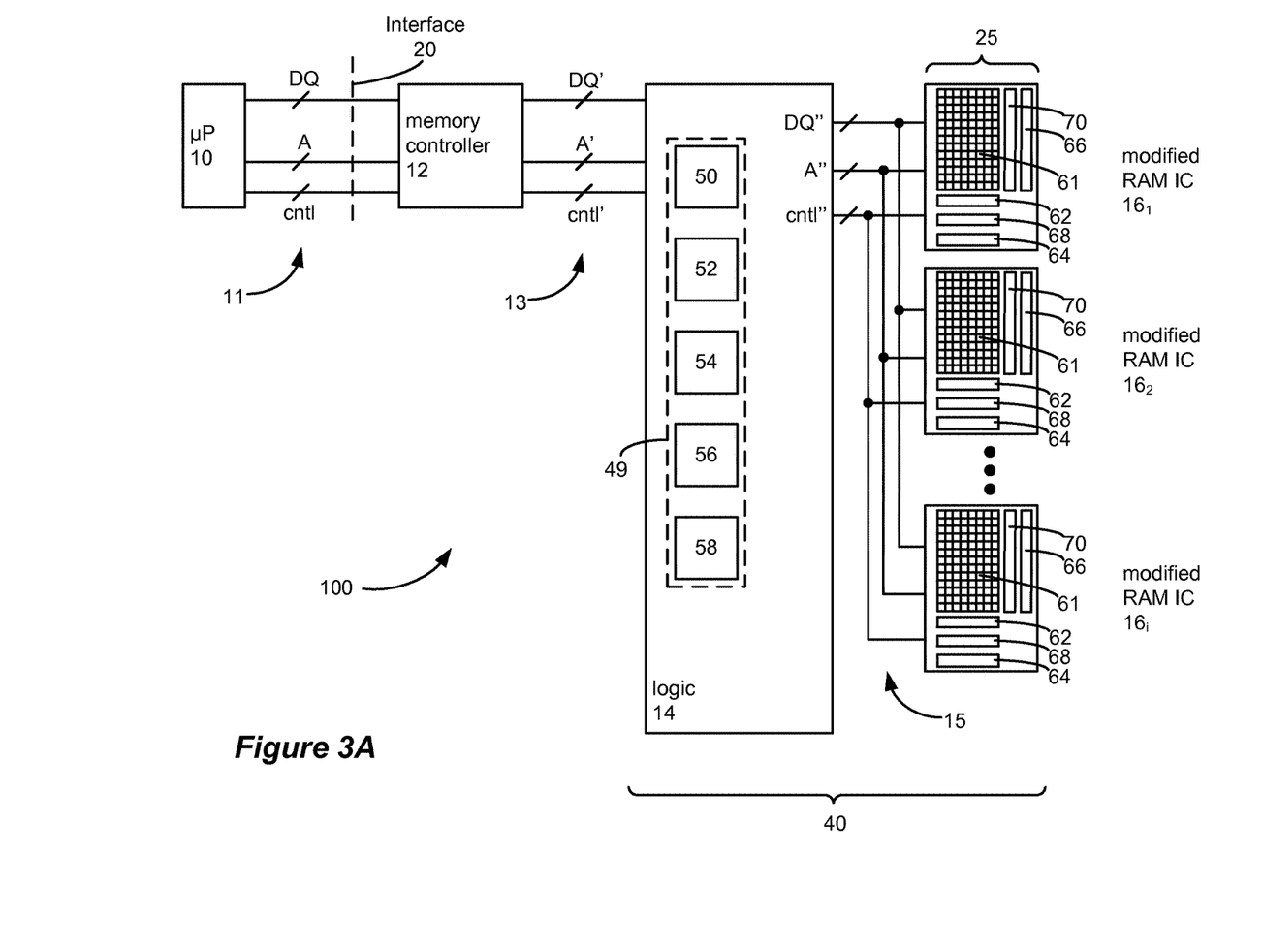
FIG. 3A illustrates a system in which modified RAM ICs are used in conjunction with a logic integrated circuit having circuitry implementing functions traditionally present on RAM ICs.

A system 100 benefitting from the implementation of DBI is shown in FIG. 3A. System 100 comprises a system for reading/writing from/to a memory set 25, which in the illustrated example comprises modified RAM ICs $16_x$, whose modification from otherwise standard RAM ICs is discussed further below. In such a system, it can be assumed, for illustrative purposes, that a microprocessor 10 reads from and writes to the memory set 25, but this is merely one example, and any other device or system could be used to so query the memory. In one embodiment, the modified RAM ICs $16_x$ in the memory set 25 comprise dynamic RAM (DRAM) arrays of cells 61, but could also comprise static RAM (SRAM) cells, or various other types of write/erasable non-volatile memory (e.g., NAND Flash cells, Flash EPROM cells, etc.).

Intervening between the microprocessor 10 and the memory set 25 is a memory controller 12. Memory controllers 12 are well known in the art and work to create a standard interface 20 with which the microprocessor 10 can predictably communicate. The memory controller 12 couples to the microprocessor's data (DQ), address (A), and control (cntl) busses 11, and converts them to new busses 13 DQ', A', and cntl' suitable for interfacing with a logic integrated circuit (IC) 14, discussed further below. Memory controller 12 typically comprises an integrated circuit separate and independent from other components in the system 100, but this is not strictly necessary, and the controller 12 could be integrated with other components if desired. The memory controller 12 can comprise any well known memory controller 12 used in the industry.

In the disclosed embodiment, a logic IC 14 intervenes between the memory controller 12 and the modified RAM ICs $16_x$, and in this respect both the logic IC 14 and the modified RAM ICs $16_x$ differ from standard memory typically used. Departing from such standard solutions, the logic IC 14 contains much if not all of the logic circuitry 49 typically present on a standard RAM IC (not shown). For example, the logic IC 14 can contain command decode and queuing circuitry 50. Such circuitry 50 interprets the various command signals on the cntl' data bus (such as signals write enable (WE), row address strobe (RAS), column address strobe (CAS), and chip select (CS), assuming the modified RAM arrays $16_x$ comprise DRAM memory), and issues and organizes the commands as appropriate for distribution to the modified RAM ICs $16_x$ along a control bus cntl" intervening between the logic IC 14 and the RAM ICs $16_x$. The logic IC 14 may also contain redundancy circuitry 52 for determining faulty memory addresses in the modified RAM ICs $16_x$ and for rerouting around such defective addresses to functioning memory cells using programmable fuses or antifuses, as is well known. Logic IC 14 may additionally contain error correction circuitry 54, which can comprise well known circuitry for assessing and correcting faulty data in accordance with any number of error correction algorithms. Further, logic IC 14 may contain test mode circuitry 56, which is typically used during manufacturing and/or under the application of special test commands to test the operation of the various modified RAM ICs $16_x$. Typically, such circuits 50-56 are formed as part of the peripheral logic of a standard memory integrated circuit (not shown), but in the illustrated system such circuitry has been removed from the modified RAM ICs $16_x$.

Logic IC 14 may also contain additional integration circuitry 58 not traditionally contained on a conventional RAM ICs, but which are relevant more globally to the modular integration of a number of memory arrays. For example, integration circuitry 58 can assess the operation of the various signals on bus 15 (DQ", A", cntl") intervening between the logic IC 14 and the modified RAM ICs, and if necessary can reroute around any connections deemed to be faulty.

As a result of circuits 50-58 being present on the logic IC 14, the modified RAM ICs $16_x$ need not contain such circuits, and instead modified RAM ICs $16_x$ can comprise only the array of storage cells 61 and other minimal circuitry desirable for the functioning of such cells. Such other minimal circuitry can comprise the sense amplifiers 62 used to sense the data state of the cells, column decoder circuitry 64, row decoder circuitry 66, column driver circuitry 68, and row driver circuitry 70.

By moving the logic circuitry 49 off of the modified RAM ICs $16_x$, the RAM ICs $16_x$ can be made smaller in area. Reducing the size of the RAM ICs $16_x$ helps the yield and reliability of such devices, and allows their assembly into a smaller package or packages, as discussed further below with reference to FIG. 4.

Because the logic circuitry 49 is moved off of the RAM ICs $16_x$ and onto the logic IC 14, a bus 15 intervenes between the logic IC 14 and the modified RAM ICs $16_x$, as mentioned above. Bus 15 contains data (DQ"), address (A"), and control (cntl") signals that might otherwise appear internally on a standard RAM IC.

Figure 3B:
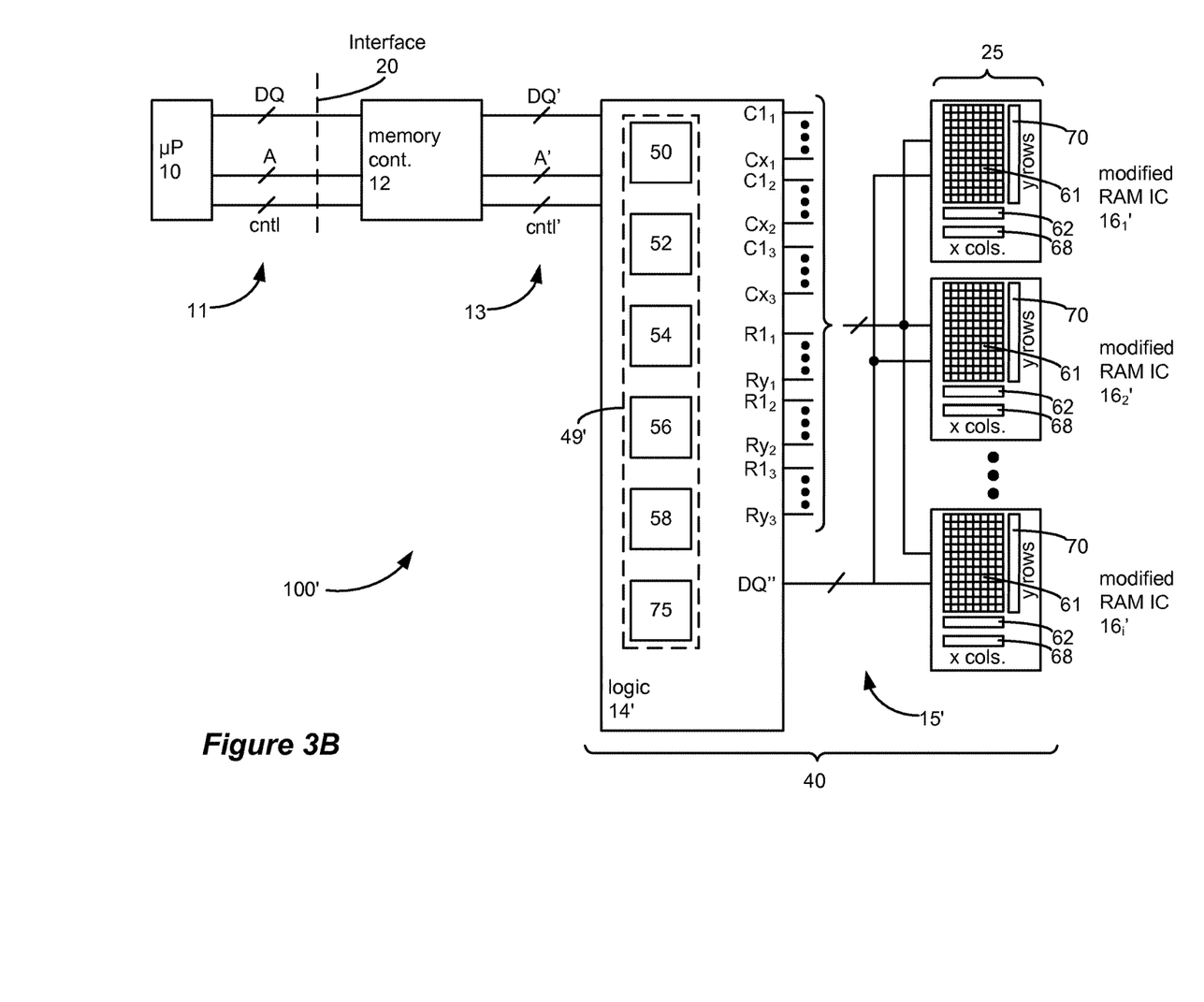
FIG. 3B illustrates a system, like that depicted in FIG. 3A, in which the logic integrated circuit also decodes the addresses for the modified RAM ICs.

FIG. 3B illustrates a modification to the system 100' in which the address decode circuitry (e.g., column and row decoders 64 and 66) has been moved off of the modified RAM ICs $16_x$ and onto the logic IC 14'. Specifically, a new address decode block 75 is included which performs column and row decoding, and (in the illustrated example) decoding to choose an appropriate one of the modified RAM ICs $16_x$. Accordingly, in this embodiment, bus 15' contains the already-decoded row and column driver signals ($Cx_i$; $Ry_i$) necessary to access any of the x columns and y rows of the various modified RAM ICs $16_x$. As shown, the column and row driver circuits 68 and 70 still remain on the modified RAM ICs 16$_x$, along with the sense amplifiers 62, but these circuit blocks could also be moved onto the logic IC 14' in an alternative embodiment, making the modified RAM ICs smaller still. While FIG. 3B illustrates a full decoding of the addresses on bus A', note that this is not strictly required and instead some or all of the address decoding could occur on the modified RAM ICs 16$_x$.

Figure 4:
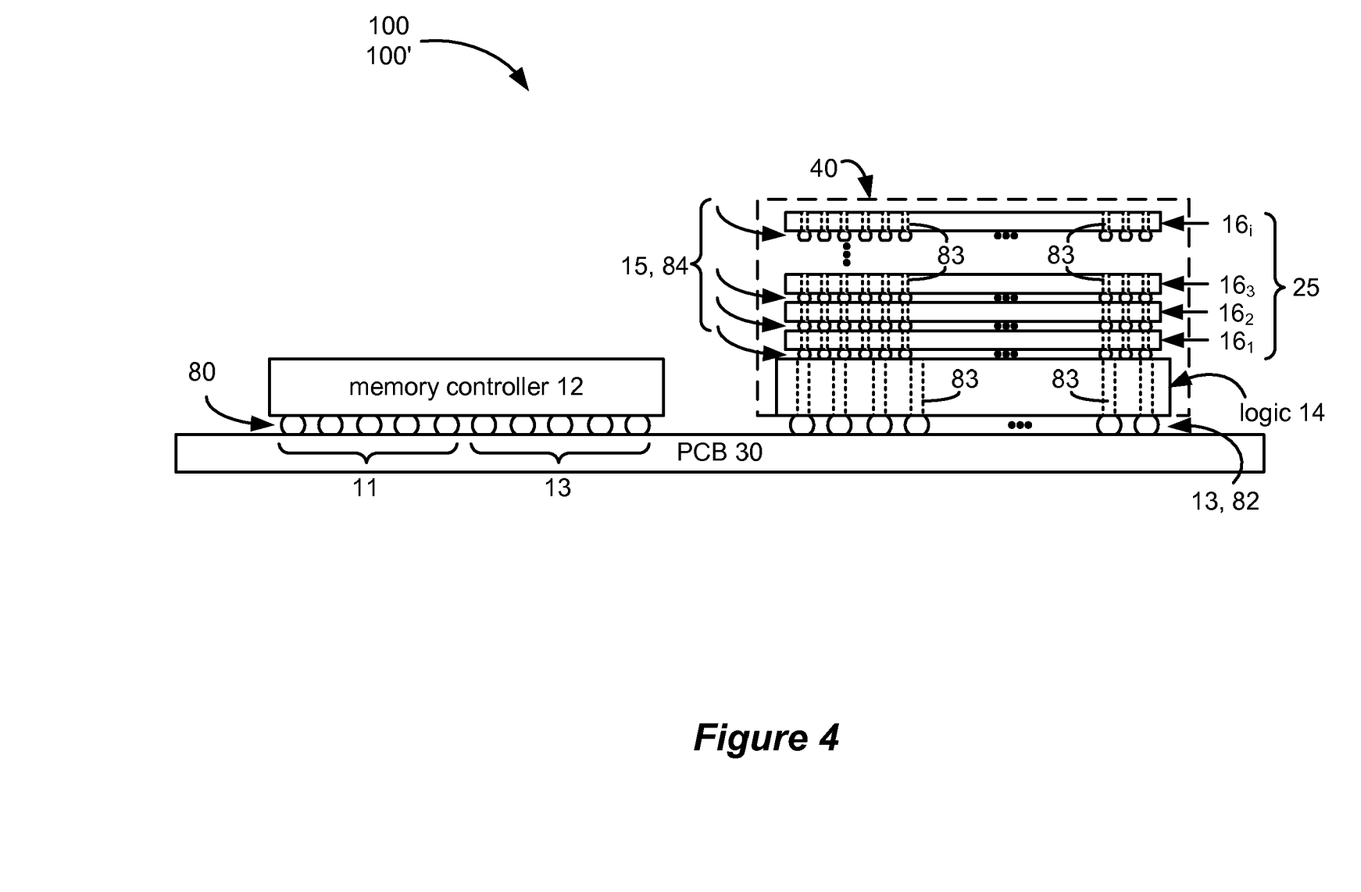
FIG. 4 illustrates how the systems of FIGS. 3A and 3B can be implemented using a vertically-stacked memory module on a printed circuit board.

FIG. 4 shows portions of the systems 100 or 100' of FIGS. 3A and 3B as they could be manufactured. As shown, a standard memory controller 12 is affixed to a printed circuit board (PCB) 30 using solder bumps 80 as is typical. Some of these bumps 80 will correspond to signals on bus 11 between the memory controller 12 and the microprocessor 10 (not shown in FIG. 4), while other bumps will correspond to signals on bus 13 between the memory controller 12 and the logic IC 14.

In the implementation shown in FIG. 4, the logic IC 14 and the modified RAM ICs 16$_x$ are integrated in a multichip module 40. As shown, the logic IC 14 and the modified RAM ICs 16$_x$ are vertically stacked in the module 40 within a singular package. To facilitate the running of the signals on bus 15, through-silicon vias (TSVs) 83 run though the logic IC 14 and the modified RAM ICs 16$_x$. The module 40 is also affixed to the printed circuit board using solder bumps 82.

Although shown with the memory controller 12 and module 40 on the same PCB 30, this is not strictly necessary. Additionally, the microprocessor 10 (not shown) could be on the same or separate PCBs from the memory controller 12 and/or the module 40. Further, any combination of the microprocessor 10, memory controller 12, and module 40 could be integrated within its own package or multichip module. Additionally, it is possible that the functionality contained within the memory controller 12 might also be moved to the logic IC 14, thus eliminating the need for the memory controller 12 and the bus 13 in the system. Thus, the assembled configuration shown in FIG. 4 is merely one example of how system 100 or 100' could be implemented.

Figure 5:
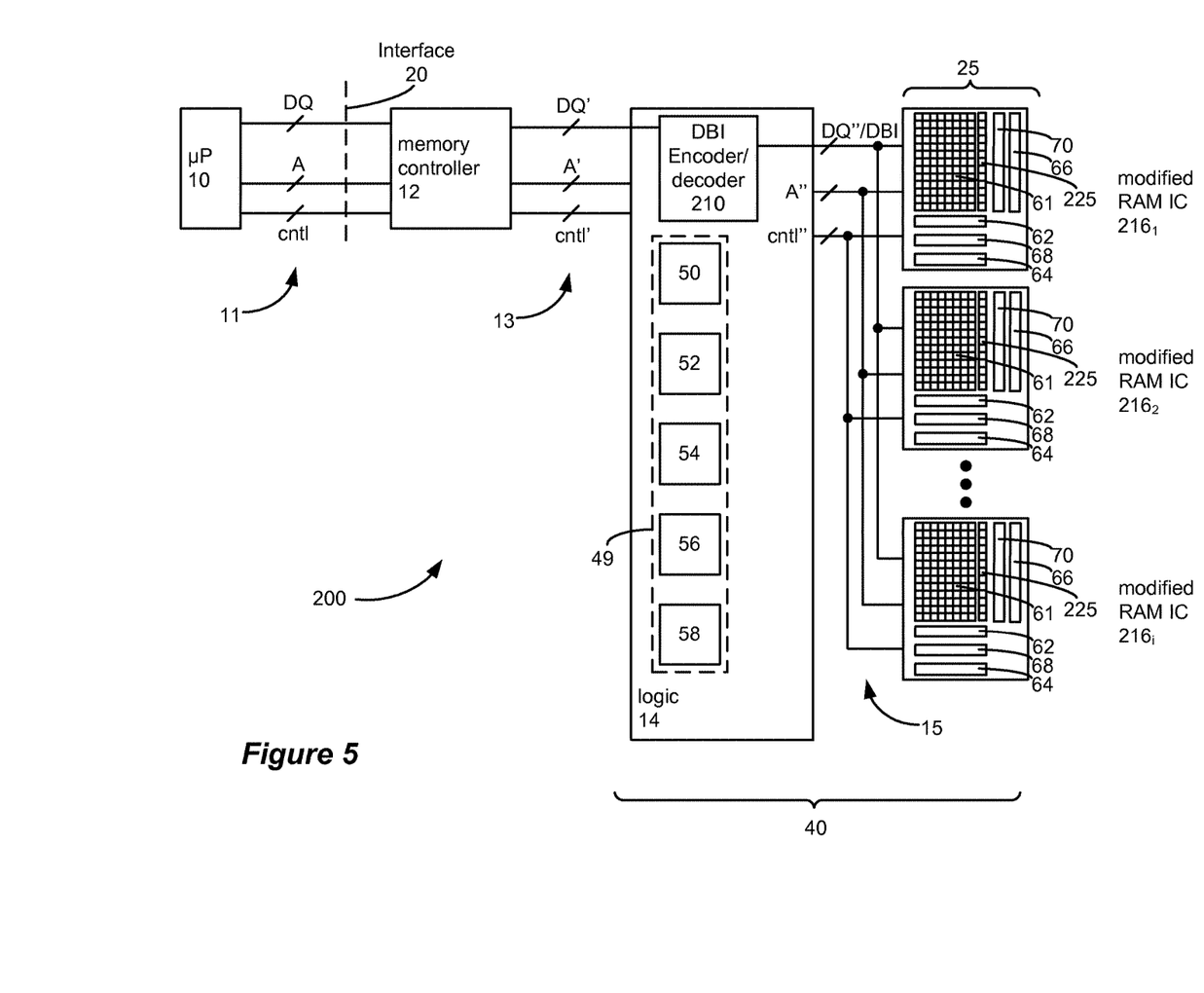
FIGS. 5 and 6 illustrate an embodiment of the invention in which DBI encoding and decoding is included on the logic integrated circuit, and in which the modified RAM ICs include a storage area for DBI bits.

With embodiments of basic systems described, discussion now turns to the application of Data Bus Inversion (DBI) to such systems. As shown in FIG. 5, system 200 has had its logic IC 14 modified to include a DBI encoder/decoder 210. The DBI encoder/decoder 210 couples to the data bus DQ" intervening between the logic IC 14 and the modified RAM ICs 216$_x$. Additionally, at least one DBI bit is included with data bus DQ". To handle this DBI bit, each of the modified RAM ICs 216$_x$ includes a DBI storage area 225.

Figure 6:
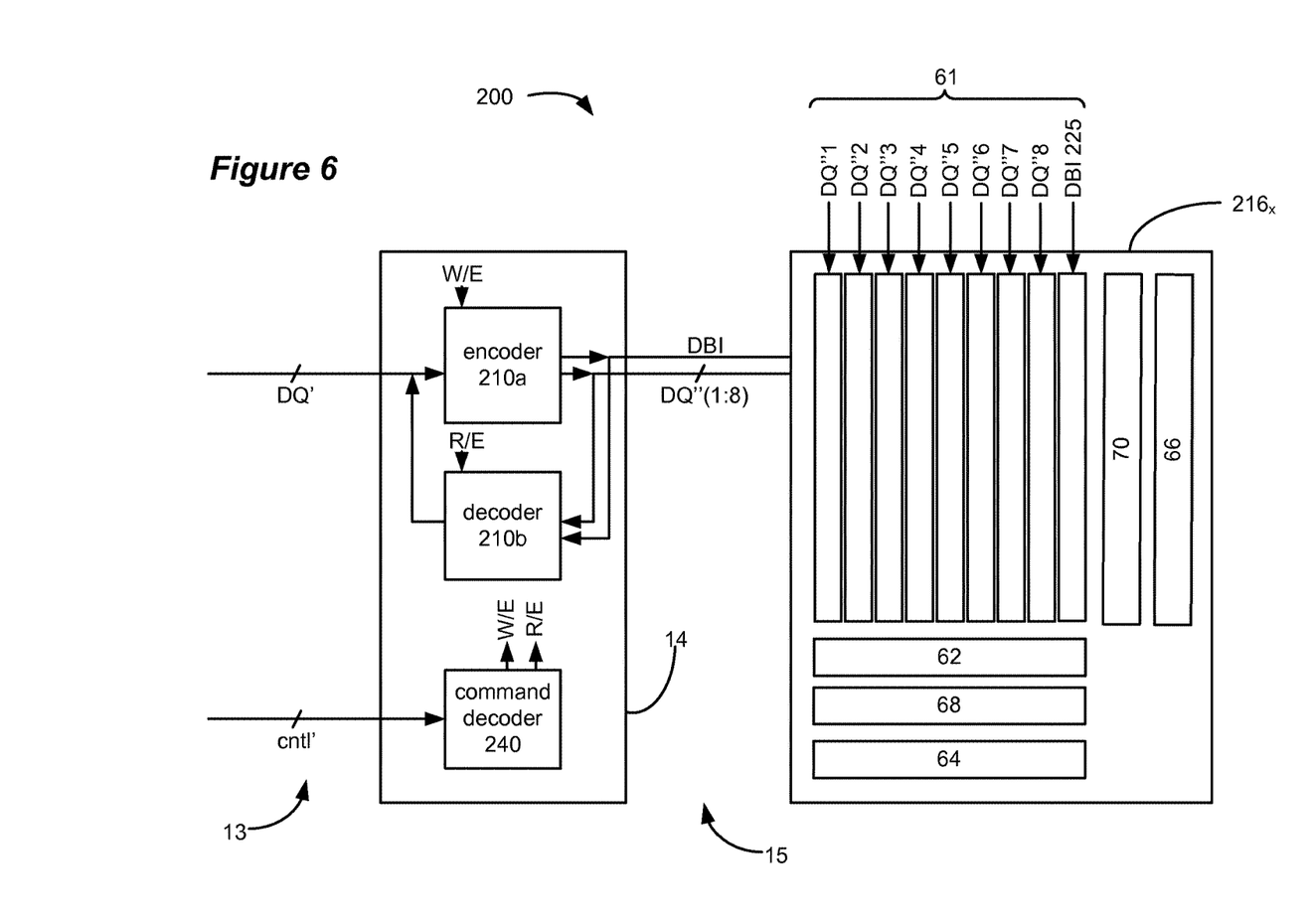

Further details concerning such an implementation of DBI in system 200 is shown in FIG. 6. As can be seen, it is assumed that the modified RAM IC 216$_x$ in this example comprises a X8 device, in which eight bits (i.e., a byte) is written/read to/from the modified RAM ICs 216$_x$ at one time. The array of memory cells 61 in the modified RAM IC 216$_x$ includes areas in which each of the eight bits DQ" 1-8 are stored. Additionally, and as just mentioned, a dedicated DBI storage area 225 is also present for the DBI bit. In effect, the modified RAM IC 216$_x$ comprises in this example a X9 device comprising at each address a data byte and its associated DBI bit. As one skilled in the art will realize, the areas dedicated to the data and the DBI bit 225 can occur in different locations on the modified RAM IC 216$_x$, and need not appear as depicted as contiguous rectangles.

DBI encoding and decoding in the depicted example are implemented by encoding 210$a$ and decoding 210$b$ circuitry. Such circuitry 210$a$ and 210$b$, in this embodiment, is present only on the logic IC 14 as opposed to the modified RAM ICs 216$_x$, which is consistent with the desired intention in system 200 to move as much of the logic circuitry off of the modified RAM ICs 216$_x$ and onto the logic IC 14 as possible.

When writing to the modified RAM IC 216$x$ (or more generally, the memory set 25), data is presented from the memory controller 12 to the logic IC 14 on bus DQ', along with the appropriate address for that data and a write command as embodied in the signals present on control bus, cntl'. (The address bus from the memory controller 12, A', is not shown in FIG. 6 for clarity, but may share a bus with the control signals in a time multiplexed fashion.). A command decoder 240 on the logic IC 14 interprets the write command and enables the encoder 210$a$ via a write enable signal, W/E. The encoder 210$a$ may be similar to that shown earlier in FIGS. 2A and 2B, and will operate in accordance with a desired DBI algorithm, of which many exist. The encoder 210$a$ assesses the incoming bytes of data on DQ', and issues new data DQ" and a DBI bit in accordance with the DBI algorithm. Data DQ" may there be completely or partially inverted depending on the algorithm and the state of the given DBI bit. In any event, a given encoded data byte DQ" is stored with its DBI bit at the appropriate address in the modified RAM IC 216$_x$.

Reading from the modified RAM IC 216$_x$ (i.e., from memory set 25) requires decoding of the stored data in accordance with the DBI bit stored with that data. This occurs as follows. Control decoder 240 on the logic IC interprets a read command, and enables the decoder 210$b$ via read enable signal, R/E. Encoded data is then read at the specified address from the modified RAM IC 216$_x$ on bus DQ" along with the DBI stored at that address. The decoder 210$b$ interprets the DBI bit, and decodes, i.e., completely or partially un-inverts the data as necessary, and passes the decoded data to the memory controller 12 via bus DQ'.

This example allows for the implementation of DBI without requiring the modified RAM ICs 216$_x$ to have any DBI logic circuitry whatsoever. However, in this embodiment, the modified RAM ICs 216$_x$ will need to store the DBI bit, which will either require the modified RAM ICs 216$_x$ to increase in size, or to store less data within the nominal size.

Figure 7A:
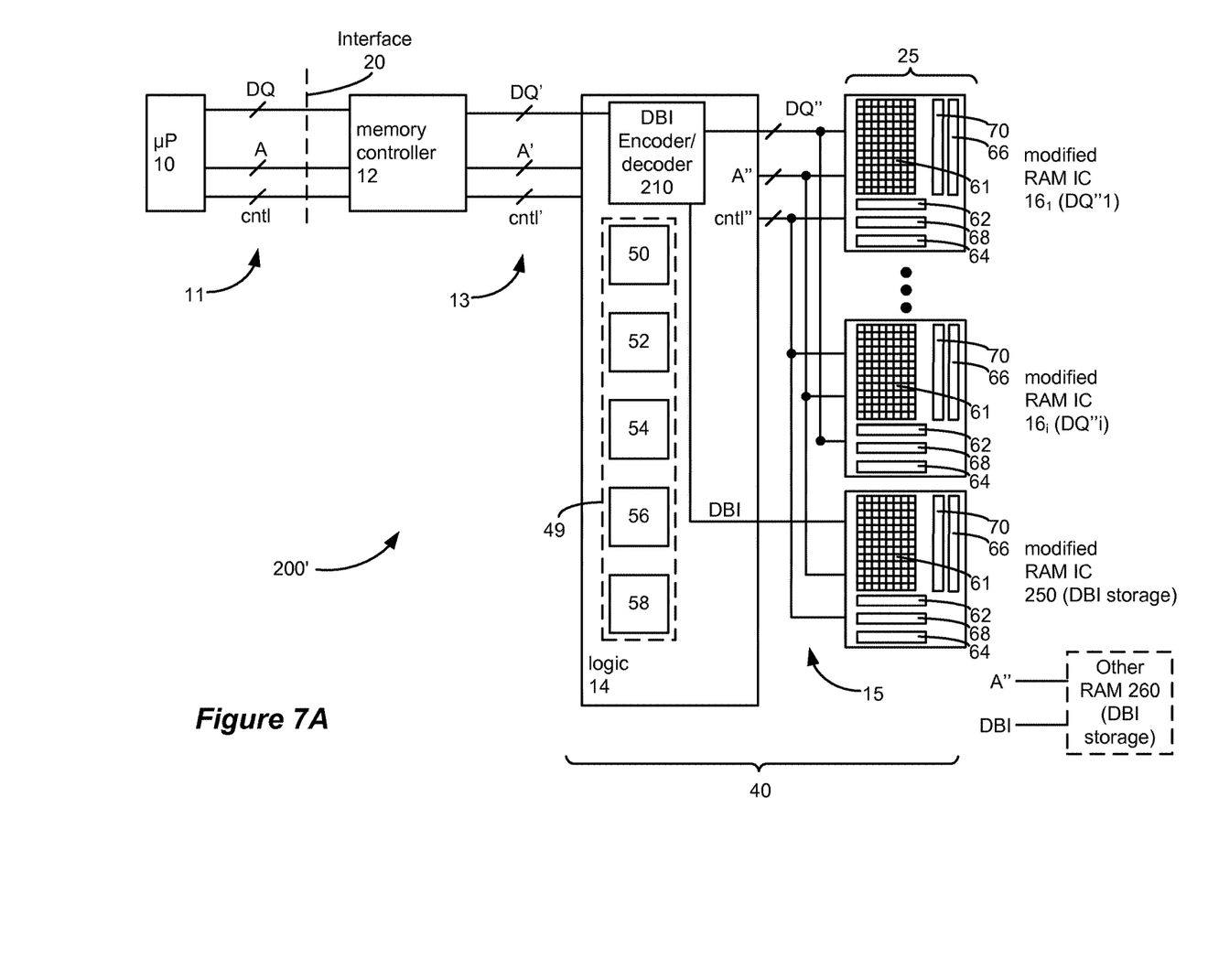
FIGS. 7A and 7B illustrate a system, similar to that of FIGS. 5 and 6, in which a modified RAM IC is dedicate to providing DBI storage.

Another embodiment of the disclosed DBI technique that does not require storage of the DBI bits is shown in the system 200' of FIG. 7A. In this embodiment, the modified RAM ICs do not require an additional DBI storage area 225, and hence can be the same as the modified RAM ICs 16$_x$ discussed in conjunction with FIGS. 3A and 3B. However, in this embodiment, one of the modified RAM ICs, specifically RAM IC 250, is dedicated to the storage of DBI bits. Such an architecture for system 200' is logically implemented assuming the modified RAM ICs 16$_x$ and 250 are x1 devices. Accordingly, when a byte of data is written to the modified RAM ICs 16$_x$ (i.e., memory set 25), each bit in the encoded byte is sent to a particular one of the modified RAM ICs 16$x$, i.e., RAM IC 16$_1$ receives DQ"1, etc., and the DBI bit gets stored in parallel in modified RAM IC 250. Thus, a given address in this example causes writing to/reading from all of the modified RAM ICs in the memory set 25. While this implementation requires no further modifications to the modified RAM ICs 16$_x$ and 250, it will require an additional modified RAM IC 250 to be present in the module 40 if the same amount of data is to be stored, as shown in FIG. 7B.

Figure 7B:
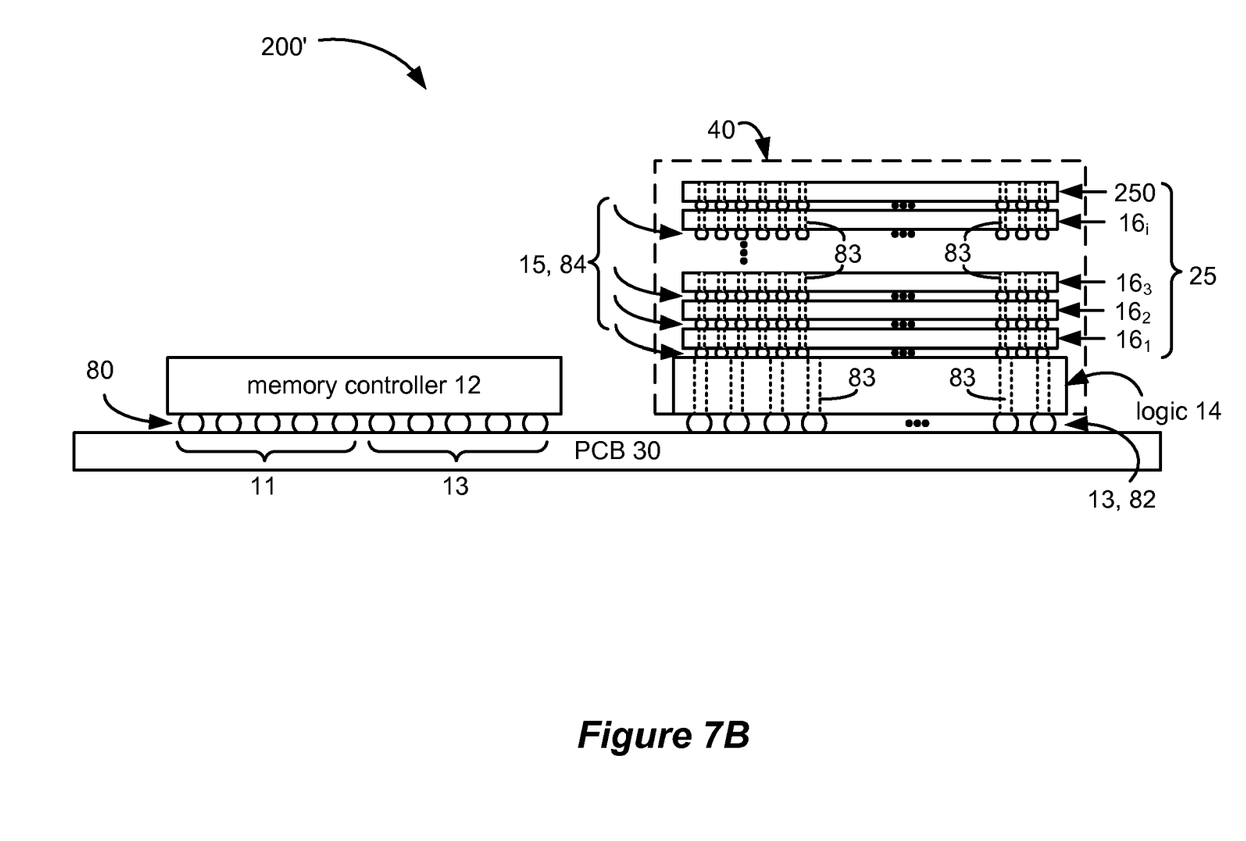

If it is undesired or impossible to include an additional modified RAM IC 250 within the module 40 as shown in FIGS. 7A and 7B, one could substitute the modified RAM IC 250 within the module 40 for RAM residing outside of the module 40. For example, other RAM 260, shown in dotted lines in FIG. 7A, could be used for storage of the DBI bit, which other RAM 260 could appear outside of the module 40, such as for example, in the logic IC 14, in the memory controller 12, or as a separate device in the system 200'. So long as such other RAM 260 is connected to the same address as its encoded data in the modified RAM ICs $16_x$, proper DBI encoding and decoding can be established.

Figure 8A:
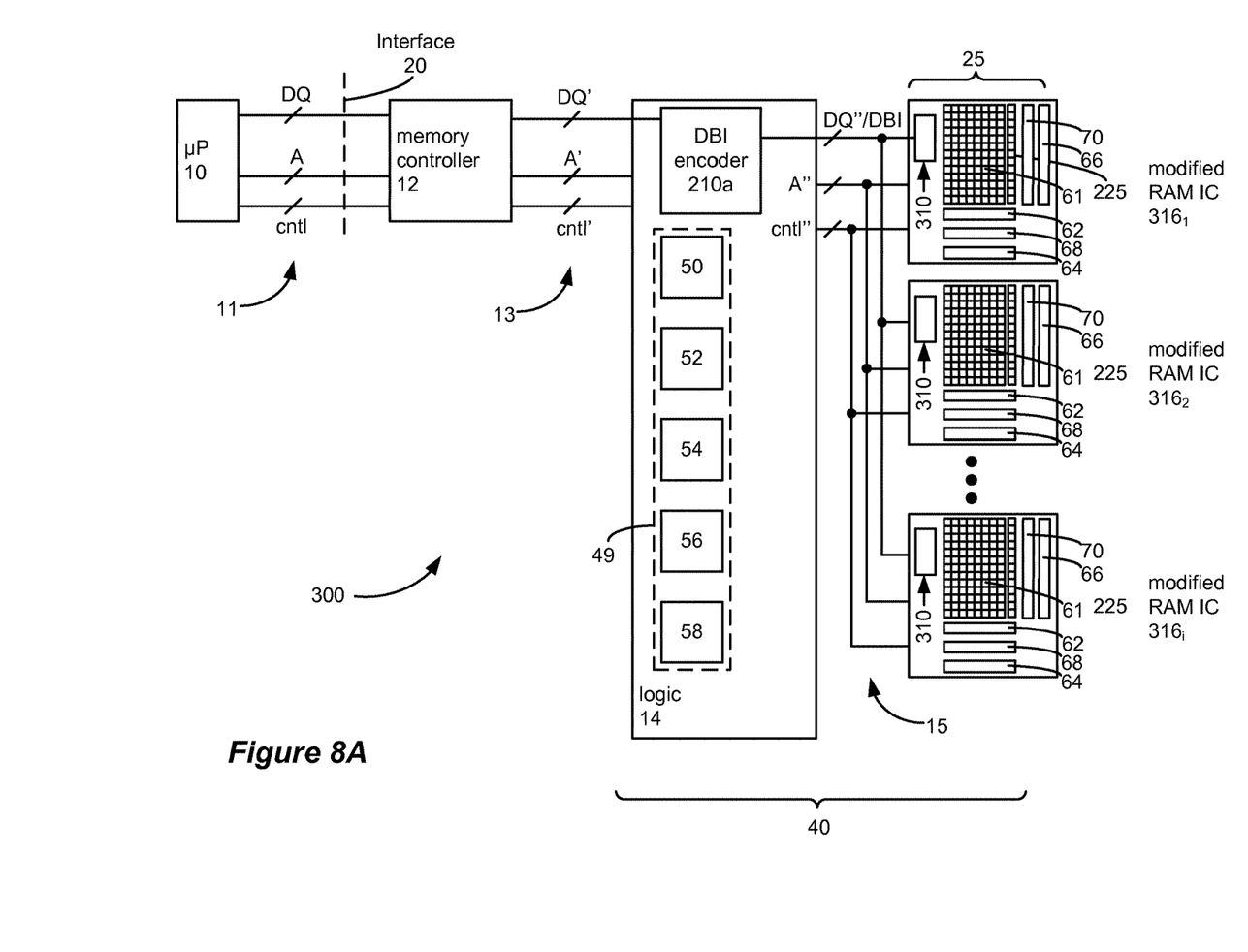
FIGS. 8A-8C illustrate another embodiment of the invention in which DBI encoding is included on the logic integrated circuit, but DBI decoding is included on the modified RAM ICs, allowing for one-way DBI implementation but obviating the need to store DBI bits within the modified RAM ICs.
Figure 8B:
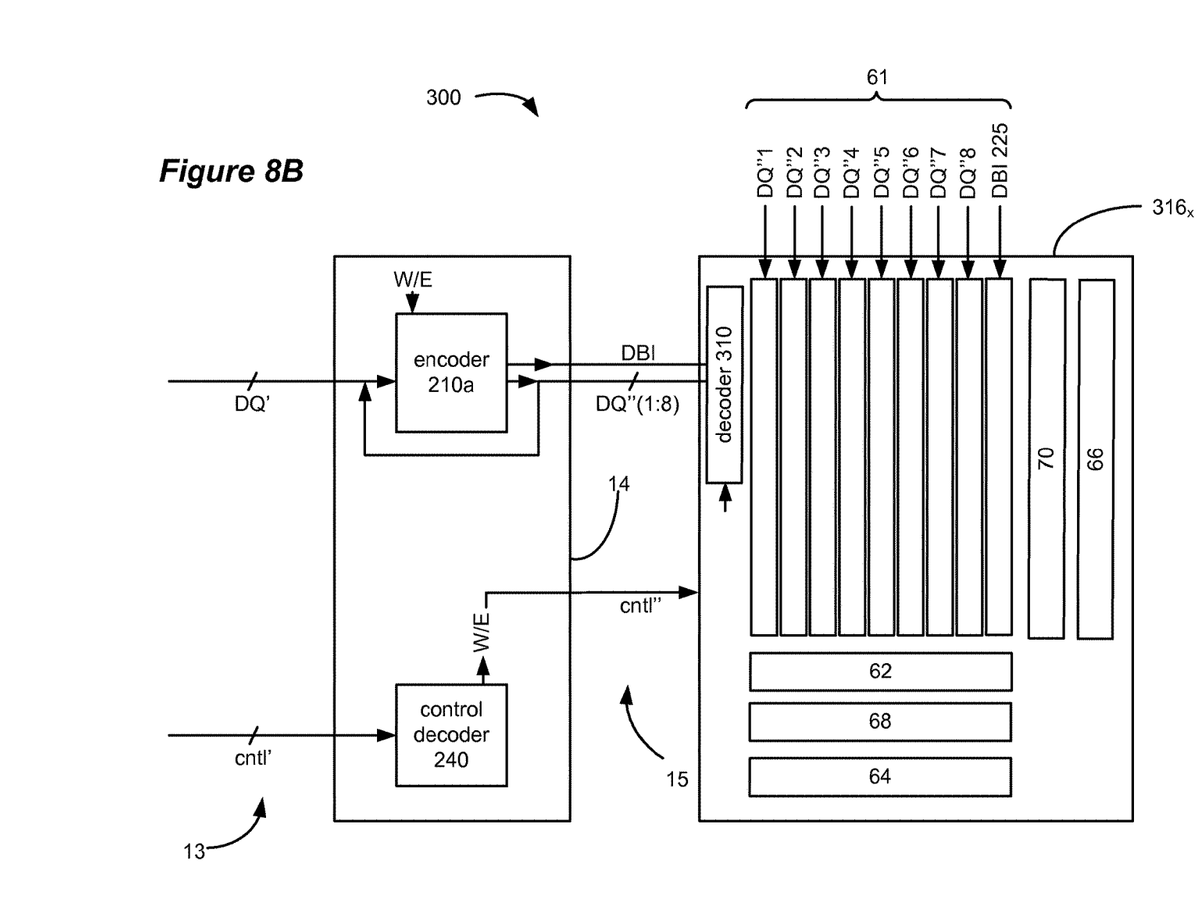
Figure 8C:
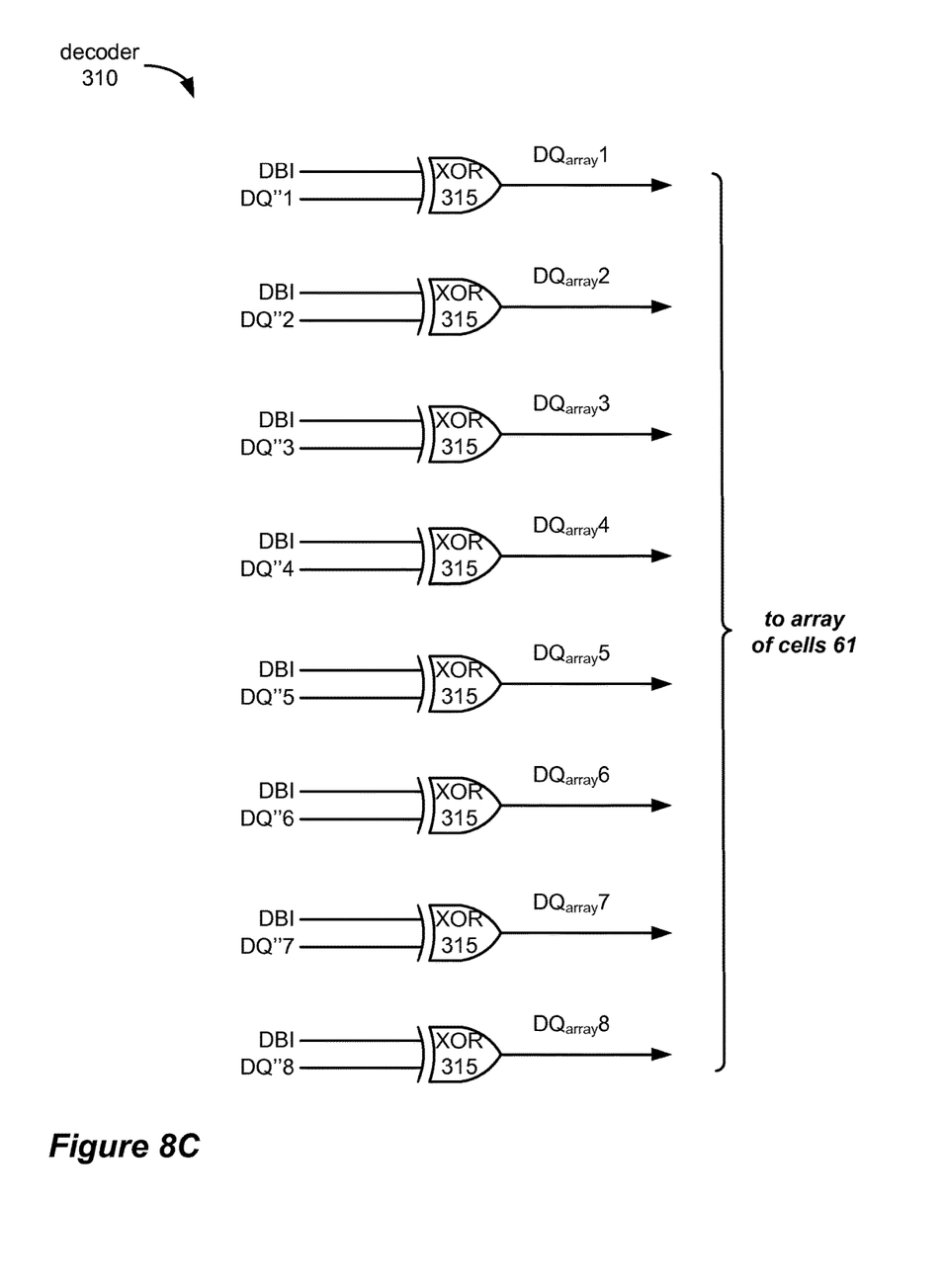

FIGS. 8A-8C illustrate another embodiment of a system 300 implementing the disclosed DBI technique in which DBI is applied to the data in only one direction of the data flow between the logic IC 14 and the memory 25. Specifically, in the depicted embodiment, DBI is applied to reduce data transmissions only when writing data to the memory set 25. Accordingly, logic IC 14 only contains a DBI encoder 210a, as shown in FIGS. 8A and 8B. The corresponding decoder for this one-way DBI implementation appears on the modified RAM ICs $316_x$ as decoder block 310.

Operation of the one-way DBI algorithm in system 300 is explained further in FIGS. 8B and 8C. As shown, encoded data DQ" (1:8), encoded via a suitable DBI algorithm at encoder 210a on the logic IC 14, is sent to modified RAM ICs $316_x$ via bus 15. Each of the modified RAM ICs $316_x$ contains a decoder 310. When writing is taking place, command decoder 240 (which can be present on the logic IC 14, the modified RAM ICs $316_x$, or elsewhere), issues a write enable signal, W/E, which enables both the encoder 210a on the logic IC 14. This causes encoder 210a to issue encoded data DQ" on bus 15, which may or may not be completely or partially inverted depending on the DBI algorithm being used.

In any event, while writing (i.e., while W/E is asserted), decoder 310 will take the encoded data DQ" after transmission on the bus 15 and un-invert such data as mandated by the DBI bit at the modified RAM ICs $316_x$. Such decoding can be accomplished by the simple utilization of XOR gates 315 for each of the data channels, DQ", as shown in FIG. 8C. In this embodiment, decoder 310 can always remain enabled, as XOR gates only consume power during transitions. However, the W/E signal may still be used to enable other aspects of the receiving circuitry within memory set 25. Assuming the implementation of a simple minimum transitions DBI algorithm, decoder 310 will include eight XOR gates, i.e., one for each of the data bits from the byte, which XOR gates receive at their inputs the current DBI bit and one of the bits in the encoded byte. If inversion occurred for a given byte of data (i.e., if DBI='1'), XOR gates 315 will un-invert the data, producing true, un-encoded data bytes $DQ_{array}$ (1:8) which will be stored in the modified RAM ICs $316_x$.

To reiterate, by operation of the DBI encoder 210a on the logic IC 14 and decoder 310 on the RAM ICs $316_x$, data is or is not inverted during transmission to the modified RAM ICs $316_x$ across bus 15 to improve power consumption, data integrity, and reliability. But, the inverted data is then decoded and stored in its true state in the array of cells 61 of those RAM ICs $316_x$. By contrast, when reading from system 300, no DBI algorithm operates in this embodiment, and instead the true data is merely read from the modified RAM ICs $316_x$ and is transmitted back across bus 15 without encoding.

As a result, and beneficially, in this embodiment of FIGS. 8A-8C, there is no need to store the DBI bit, because the data is decoded by decoder 310 on the modified RAM ICs $316_x$ before it is written into the RAM ICs. Provisions therefore do not need to be made, as in earlier embodiments, to provide a DBI storage area 225 on the modified RAM ICs $316_x$ (FIGS. 5 and 6), nor is a dedicated DBI storage modified RAM ICs 250 necessary (FIGS. 7A and 7B).

However, this embodiment does require that the modified RAM ICs $316_x$ include a DBI decoder 310. Generally, the provision of such a decoder 310 on the modified RAM ICs $316_x$ is contrary to the desire that the modified RAM ICs contain as little excess circuitry as possible. But as shown in FIG. 8C, such a DBI decoder 310 can require little more than the inclusion of XOR gates 315 or other simple digital logic gates on the modified RAM ICs $316_x$, which additional decoding logic 310 is negligible in the context of the modified RAM IC $316_x$, and takes up minimal layout area on the modified RAM ICs $316_x$. For clarity's sake, it is repeated here that although the implementations described herein function with only one DBI bit, more complex DBI algorithms could be implemented which might require multiple DBI bits.

In another embodiment (not shown), the DBI encoder can be provided on the modified RAM ICs, while a DBI decoder is present on the logic IC 14. This presents essentially the reverse of the one-way DBI technique discussed in FIGS. 8A-8C, such that DBI operates when reading from the memory set 25, but does not operate when writing to the memory set 25. While such an implementation would certainly be functional, provision for DBI encoder circuitry on the modified RAM ICs may be incompatible with the goals of the system. This is because encoding circuitry may take a significant amount of area (at least, compared to the decoder) to accommodate the analog circuitry (e.g., operational amplifiers, etc.) such encoders typically require. As such, encoding circuitry may be better relegated to the logic IC 14 in a system in which the modified RAM ICs $316_x$ are made as small as possible.

Any of the DBI implementation set forth in FIGS. 5-8C can be implemented in a system in which the data is fully or partially decoded, as shown in FIG. 3B. However, such systems that in effect combine the system of FIG. 3B with the systems of FIGS. 5-8C are not illustrated because such an extension of the disclosed techniques should be apparent to one skilled in the art on the basis of this disclosure.

While envisioned for use with discrete integrated memory circuits, the disclosed technique can be used more generally with any memory structure having storage cells, even if not a discrete integrated circuit. For example, a plurality of memory sub-arrays could operate as the plurality of memory structures useable in the technique, even if such sub-arrays are themselves integrated on a single integrated circuit. Additionally, while illustrated in the context of a plurality of memory ICs (or a plurality of memory structures more generally), it should be noted that the disclosed technique still has applicability when used with a single memory IC (or memory structure).

As noted earlier, many different types of DBI algorithms exist. Different DBI algorithms are beneficial in different circumstances, and not all DBI algorithms are directed to minimizing the number of data transition across transmission channels. For example, other well-known DBI algorithms include the "minimum zeros" algorithm and the "minimum ones" algorithm. The purpose of these algorithms is, respectively, to minimize the number of binary zeros or binary ones transmitted across a channel. Such minimum zeros or ones algorithms conserve power when the driver or receiver circuits coupled to the transmission channels are not full CMOS and therefore will draw more power when transmitting or receiving a particular data state. For example, if a pull-up resistor connected to the voltage supply is used in a particular driver circuit, driving a logic '0' will require more power than would driving a logic '1'. As a result, use of a minimum zeros DBI algorithm would be warranted. Likewise, if a pull-down resistor is used, a minimum ones algorithm would be warranted. The minimum transitions and either of the minimum zeros or ones algorithms can also be combined in a DBI algorithm, as is disclosed in U.S. patent application Ser. No. 12/015,311, filed Jan. 16, 2008. In another DBI algorithm, discussed in the above-mentioned Ser. No. 11/873,779 application, only a portion of the data bits on a bus are inverted to balance the logic states in an encoded byte across the bus, which can be referred to as a Balanced DBI algorithm. Regardless of the DBI algorithm used, all of these DBI algorithms have the common feature of sequentially receiving groups of N original data bits and selectively encoding each group to form a corresponding group of N encoded data bits while issuing at least one encoding (DBI) indicator associated with each group of the N encoded data bits. Any of these DBI algorithms can be used in the context of the disclosed embodiments of the invention, and therefore the illustration or focus given to the minimum transition DBI algorithm should be understood as merely exemplary and non-limiting.

While some implementations have been disclosed, it should be understood that the disclosed circuitry can be achieved in many different ways to the same useful ends as described herein. In short, it should be understood that the inventive concepts disclosed herein are capable of many modifications. To the extent such modifications fall within the scope of the appended claims and their equivalents, they are intended to be covered by this patent.

What is claimed is:

1. A system comprising:
a plurality of hardware-modified memory integrated circuits to couple to a controller, the controller to read data bits from and write data bits to the plurality of hardware-modified memory integrated circuits; and
a logic integrated circuit intervening between the plurality of hardware-modified memory integrated circuits and the controller, the logic integrated circuit to be coupled to the controller system by a first bus and coupled to the plurality of hardware-modified memory integrated circuits by a second bus, the logic integrated circuit comprising
an encoder to receive sequentially from the controller groups of N original data bits, the encoder being configured to encode selectively each group of the N original data bits to form a corresponding group of N encoded data bits, and to issue at least one encoding indicator associated with each group of the N encoded data bits, the encoder being further to transmit the group of N encoded data bits and their associated at least one encoding indicator to at least one memory integrated circuit of the plurality of hardware-modified memory integrated circuits,
test mode circuitry, and
at least one circuit selected from a group of circuits consisting of command decoder and queuing circuitry for the plurality of hardware-modified memory integrated circuits, redundancy circuitry to determine faulty memory addresses in the at least one memory integrated circuit and to reroute around such faulty addresses to functioning ones of the plurality of hardware-modified memory integrated circuits, and address decode circuitry for the at least one memory integrated circuit, the at least one memory integrated circuit not containing the test mode circuitry or the at least one circuit or the encoder that are present on the logic integrated circuit.

2. The system of claim 1, wherein the plurality of hardware-modified memory integrated circuits each comprise a decoder to receive sequentially each group of the N encoded data bits and their associated at least one encoding indicator, the decoder being configured to decode selectively each group of the N encoded data bits in accordance with their at least one encoding indicator to recover each group of the N original data bits, at least ones of the plurality of hardware-modified memory integrated circuits being configured to store each of the recovered groups of the N original data bits.

3. The system of claim 1, wherein the logic integrated circuit and the plurality of hardware-modified memory integrated circuits are vertically stacked in a module.

4. The system of claim 1, wherein the encoder is to encode selectively each group of the N original data bits using an algorithm that selectively inverts at least some of the N original data bits in each group to form the groups of the N encoded data bits.

5. The system of claim 1, wherein the logic integrated circuit further comprises error correction circuitry for assessing and correcting faulty data in the plurality of hardware-modified memory integrated circuits, the error correction circuitry not being contained within the plurality of hardware-modified memory integrated circuits.

* * * * *